(12) United States Patent
Jeong et al.

(10) Patent No.: US 10,445,171 B2
(45) Date of Patent: Oct. 15, 2019

(54) ON-THE-FLY ERROR DETECTION ALGORITHM DURING RETRY PROCEDURE

(71) Applicant: Seagate Technology LLC, Cupertino, CA (US)

(72) Inventors: Seung Youl Jeong, Kyunggi-Do (KR); Min Gyeong Son, Yongin-si (KR); Eun Yeong Hong, Suwon-Si (KR); Hyunjun Lee, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 289 days.

(21) Appl. No.: 15/056,863

(22) Filed: Feb. 29, 2016

(65) Prior Publication Data
US 2017/0249206 A1   Aug. 31, 2017

(51) Int. Cl.
*G06F 11/00* (2006.01)
*G06F 11/07* (2006.01)

(52) U.S. Cl.
CPC ........ *G06F 11/0793* (2013.01); *G06F 11/079* (2013.01); *G06F 11/0727* (2013.01); *G06F 11/0751* (2013.01)

(58) Field of Classification Search
CPC ............... G06F 11/0793; G06F 11/079; G06F 11/0727; G06F 11/0751
USPC ...................................................... 714/6.12
See application file for complete search history.

(56) References Cited

U.S. PATENT DOCUMENTS

| | | | |
|---|---|---|---|
| 5,774,285 A | 6/1998 | Kassab et al. | |
| 6,043,946 A * | 3/2000 | Genheimer | G11B 5/012 360/53 |
| 6,052,804 A * | 4/2000 | Thowe | G11B 19/04 714/1 |
| 6,104,766 A | 8/2000 | Coker et al. | |
| 6,158,027 A | 12/2000 | Bush et al. | |
| 6,275,346 B1 | 8/2001 | Kim et al. | |
| 6,314,433 B1 * | 11/2001 | Mills | G11B 20/1803 360/53 |
| 6,538,839 B1 * | 3/2003 | Ryan | G11B 5/5582 360/75 |
| 6,556,006 B1 | 4/2003 | Li et al. | |
| 6,591,198 B1 | 7/2003 | Pratt | |
| 6,735,029 B2 | 5/2004 | Seng et al. | |
| 7,245,444 B2 | 7/2007 | Galbraith et al. | |
| 7,725,316 B2 | 5/2010 | Chengalvarayan et al. | |

(Continued)

OTHER PUBLICATIONS

Kim, Gukhui; Issue Notification for U.S. Appl. No. 14/503,903, filed Oct. 1, 2014, dated Jul. 8, 2015, 1 pg.

(Continued)

*Primary Examiner* — Yair Leibovich
(74) *Attorney, Agent, or Firm* — Taylor English Duma LLP

(57) ABSTRACT

Technologies are described herein for or enhancing error recovery procedures in a storage device by utilizing on-the-fly error type detection. After a read error has occurred, a number of read retries are performed through an adaptive read channel in the storage device. The current channel parameters of the adaptive read channel are then compared to a number of predetermined channel parameter sets, each associated with an error type, to determine the most probable type of error that occurred. Finally, an error recovery sequence is selected to recover from the read error based on the determined error type.

16 Claims, 8 Drawing Sheets

(56) References Cited

U.S. PATENT DOCUMENTS

| | | |
|---|---|---|
| 7,885,151 B1 | 2/2011 | Mitchem et al. |
| 7,911,901 B2 | 3/2011 | Sutardja |
| 8,154,816 B1 | 4/2012 | Voo |
| 8,233,570 B2 | 7/2012 | Heidari et al. |
| 8,290,102 B2 | 10/2012 | Kaynak et al. |
| 8,670,199 B2 | 3/2014 | Blinick et al. |
| 8,719,682 B2 | 5/2014 | Han et al. |
| 9,093,083 B1 * | 7/2015 | Kim ................. G11B 5/012 |
| 9,536,563 B1 * | 1/2017 | Liu ................. G11B 20/1879 |
| 2006/0107177 A1 * | 5/2006 | Ishii ................. G06F 11/1008 714/758 |
| 2014/0063637 A1 | 3/2014 | Pan et al. |

OTHER PUBLICATIONS

Kim, Gukhui; Non-Final Office Action for U.S. Appl. No. 14/503,903, filed Oct. 1, 2014, dated Dec. 4, 2014, 11 pgs.

Kim, Gukhui; Notice of Allowance for U.S. Appl. No. 14/503,903, filed Oct. 1, 2014, dated Apr. 14, 2015, 6 pgs.

Kim, Gukhui; U.S. Patent Application entitled: Adapive Read Channel System for Different Noise Types, U.S. Appl. No. 14/503,903, filed Oct. 1, 2014; 24 pgs.

Wikipedia; Noise-Predictive Maximum-Likelihood (NPML) Detection (https://en.wikipedia.org/wiki/Noise-Predictive_Maximum-Likelihood_(NPML)_Detection), last modifiied on Jul. 19, 2014, accessed on Sep. 30, 2014, 7 pgs.

* cited by examiner

ON-THE-FLY ERROR DETECTION ALGORITHM DURING RETRY PROCEDURE

BRIEF SUMMARY

The present disclosure relates to technologies for enhancing error recovery procedures in a storage device by utilizing on-the-fly error type detection. According to some embodiments, a method for recovering from a read error in a storage device comprises performing a number of read retries through an adaptive read channel of the storage device, and then determining an error type by comparing current channel parameters of the adaptive read channel to a plurality of predetermined channel parameter sets stored in a memory, each predetermined channel parameter set being associated with an error type. Finally, an error recovery sequence is selected to recover from the read error based on the determined error type.

According to further embodiments, an adaptive read channel system comprises a read channel including at least one adaptive component, a memory storing a plurality of predetermined channel parameter sets, each predetermined channel parameter set associated with an error type, and a processor operably connected to the memory and the read channel. The processor is configured to determine whether a read error has occurred in the read channel, and if an error has occurred, perform at least one read-retry while training current channel parameters for the read channel to the error environment. After the at least one read-retry, the processors compares the current channel parameters with the plurality of predetermined channel parameter sets to determine a most probable error type, and an error recovery sequence for recovering from the read error is selected based on the determined most probable error type.

According to further embodiments, a computer-readable medium has processor-executable instructions stored thereon that, when executed by a processor in a storage device, cause the processor to, upon determining that an error has occurred in a read channel of the storage device, perform at least one read-retry while training current channel parameters for the read channel to the error environment. The processor then determines an error type for the error by comparing the current channel parameters with a plurality of predetermined channel parameter sets, each predetermined channel parameter set associated with an error type. An error recovery sequence for recovering from the error may then be selected based on the determined error type.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
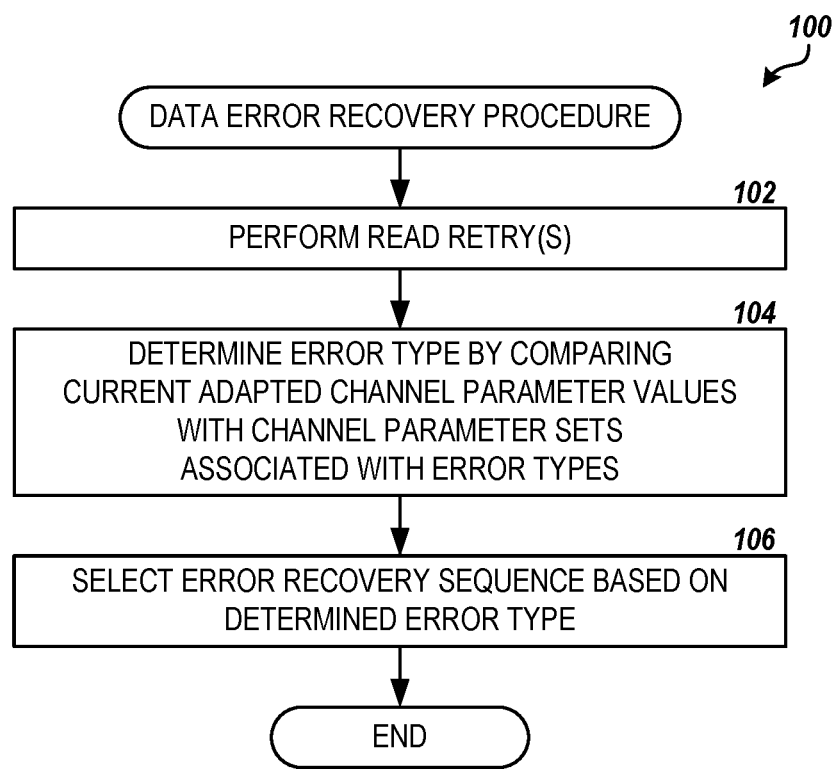
FIG. 1 is a flow diagram showing one routine for an enhanced error recovery procedure in a storage device utilizing on-the-fly error type detection, according to embodiments described herein.

The following detailed description is directed to technologies for more enhancing error recovery procedures in a storage device, such as a hard-disk drive ("HDD") device, by utilizing on-the-fly error type detection. An HDD device may increase data detection and decoding performance in the magnetic recording channel by utilizing a channel architecture that includes one or more adaptive components and/or modules, such as a variable-gain amplifier ("VGA"), a digital finite impulse response ("FIR") filter or "equalizer," a noise-predictive maximum-likelihood ("NPML") detector, and/or the like. These components may condition the signal from the read channel to fit the implemented detection method. For example, the components may be programmed to control the amplitude and phase of an input signal in order to improve its data detection performance.

During the read process, the components and modules may utilize channel parameter values, such as NPML coefficients, FIR filter tap coefficients, MR bias voltages or current, cutoff or boost frequencies, and/or the like, to drive the conditioning of the input signal and the detection process to account for irregularities or conditions in the channel that may introduce "noise." Accordingly, the parameters and coefficients of the read channel architecture may need to adapt to the changes in the channel environment. In a conventional adaptive system, an initial set of optimum parameter and coefficient values may be determined for the recording channel of the HDD device through a process of iteratively reading test data written to one or more data tracks while individual parameter values are changed to obtain a population of error rates for a range of parameter values. The optimum channel parameter values may then be selected from the range of parameter values.

If a read operation results in an unrecoverable data error during the normal operating mode of the HDD device (also referred to herein as the "user mode"), the adaptive process may be performed again over a series of read retries in order to re-optimize the channel parameters for the error environment. In the conventional data error recovery process, however, the steps taken to recover the data may be predetermined and generic, and may require repetitive reading of the data from the recording medium of the HDD as well as a number of complex calculations, which may reduce detection performance and potentially reduce data error recovery rates within an acceptable threshold of retries. For example, regardless of whether the error may be caused by a weak write, adjacent track erasure, adjacent track interference, or other anomaly, the data error recovery process may be the same.

According to embodiments described herein, a data error recovery procedure may be implemented in a storage device that detects the error type "on-the-fly," and then selects an error recovery procedure optimized for the error type, thus improving drive read performance and error recovery rates. During the manufacturing process, e.g., during certification testing ("CERT") or "burn-in" of the HDD device, most conditions that cause major errors can be simulated and values of adapted channel parameter values may be determined and stored according to the simulation results for each type of error. When an error occurs in the user mode, adaptive channel parameter values may be calculated over a limited number of read retries, and the calculated channel parameter values compared with the stored values of parameters for each type of error to determine the closest values, and thus the most probable error type. The retry procedure may then be optimized for the type of error to enhance the error correction probability. For example, once the error type is determined, error correction may be performed mainly on the channel parameters related to the error type among the pre-simulated channel key parameters to enhance the error correction probability. In addition, the steps in the error recover procedure may be changed or the order re-arranged to increase drive read performance.

FIG. 1 illustrates one routine for enhanced error recovery procedure in a storage device utilizing on-the-fly error type detection, according to the embodiments described herein. According to some embodiments, the routine 100 may be performed by a controller of the storage device when an unrecoverable data error occurs in the read channel. The routine 100 includes step 102, where some number of read retries are performed while the channel parameters are adapted for the error environment. If the limited number of read retries does not result in a successful read, then the routine 100 proceeds from step 102 to step 104, where the adapted channel parameter values are compared with sets of channel parameters associated with various error types to determine a current error type.

According to some embodiments, the sets of channel parameters may have been previously determined for the read channel and stored in a non-volatile memory of the storage device. Each set of channel parameters may be determined from the results of a simulation of a type of error in the channel, and stored in the memory associated with that error type. For example, during CERT processing of the HDD device, a side-track or adjacent track erasure ("STE/ATE") error may be simulated in the recording channel by writing data to a test track on the recording surface while gradually encroaching from single side track, as will be described in more detail below in regard to FIG. 5. Then, a number of reads of the test track are performed while the channel parameters for the adaptive read channel are trained for the simulated error condition. The trained channel parameters are then stored in a lookup table in the memory associated with an error type of STE/ATE. Similar procedures may be performed to create channel parameter sets associated with other error types in the lookup table, such as weak write ("WW") errors, adjacent track interference ("ATI") errors, and the like. It will be appreciated that separate sets of channel parameters for each error type may be determined for each read/write head in the HDD device, for each of a number of storage zones on the recording surfaces, and the like and stored in the lookup table further associated with the read/write head and/or zone.

During the error recovery procedure, after the channel parameters are adapted to the current channel environment over some limited number of reads, the current channel parameters are compared to the with the sets of channel parameters stored in the lookup table to determine the most probable error type. For example, a correlation between the normalized minimum distance between each set of channel parameters and the optimal channel parameters and the normalized minimum distance between the set of channel parameters and the current channel parameters for the error environment may be performed, as is described in more detail in regard to FIG. 7, with the highest correlated set of channel parameter values indicating the current error type.

From step 104, the routine 100 proceeds to step 106, where the most effective error recovery procedure for the determined error type is utilized in further attempts to recover from the error. For example, further reads may be performed while training channel parameters most related to the error type among the pre-simulated channel key parameters to enhance the error correction probability. In addition, the next steps in the error recover procedure may be changed or re-ordered to increase drive read performance. From step 106, the routine 100 ends.

Figure 2:
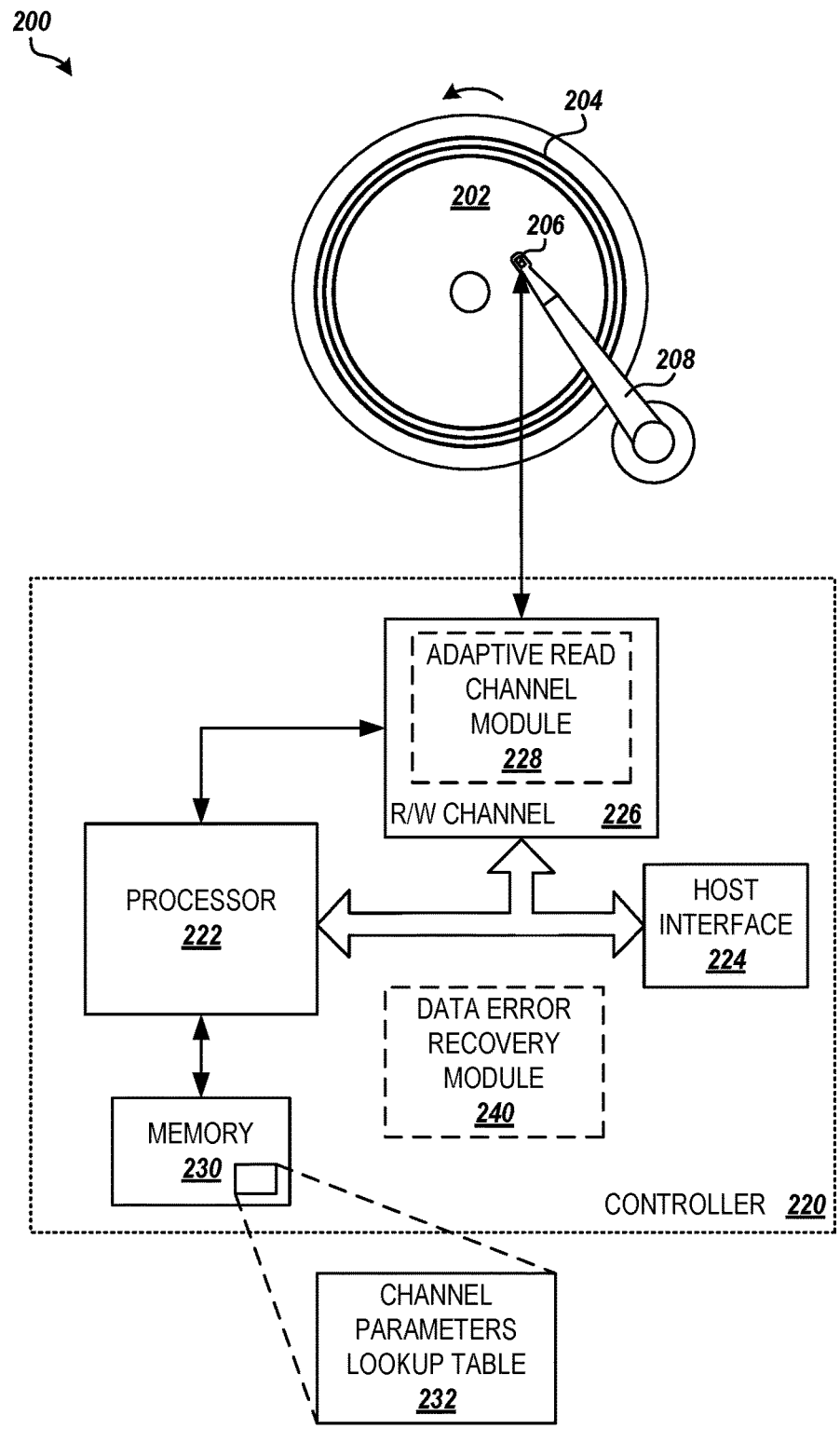
FIG. 2 is a block diagram showing components of an illustrative storage device in which the embodiments described herein may be implemented.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for determining an error type in a data error recovery procedure by correlating adaptive channel parameter values with channel parameter sets associated with various error types, according to the embodiments provided herein. The storage device 200 may include recording media comprising at least one platter or disk 202. The disk(s) 202 may include a magnetic recording surface divided or "formatted" into a number of individual data tracks, such as data track 204. The data tracks 204 may represent substantially concentric circular areas on the surface of the disk 202.

The storage device 200 further includes at least one read/write head 206 located adjacent to the recording surface of each disk 202. The read/write head 206 may read information from the disk 202 by sensing a magnetic field formed on portions of the surface of the disk, and may write information to the disk by magnetizing a portion of the surface of the disk. The read/write head 206 may be located at the distal end of an arm 208 that is rotated by an actuator, such as a voice-coil motor ("VCM"), in order to reposition the read/write head 206. The read/write head 206 may incorporate multiple components not shown in the figure or described herein, including reader elements, such as magneto-resistive ("MR") readers, tunneling MR readers, or the like, writer elements, head heaters, micro-actuators, sliders, and the like.

The storage device 200 may further comprise a controller 220 that controls the operations of the storage device. The controller 220 may include a processor 222 to monitor and control the operations of the storage device 200. The controller may further include a host interface 224 allowing the storage device 200 to communicate with a host device or other components, such as a server computer, personal computer ("PC"), laptop, tablet, game console, set-top box or any other electronics device that can be communicatively coupled to the storage device 200 to store and retrieve data from the storage device. The controller 220 may process write commands from the host device by formatting the associated data and transfer the formatted data via a read/write channel 226 through the read/write head 206 and to a target location on the recording surface of the disk 202. The controller 220 may further process read commands from the host device by determining the target location on the recording surface containing the desired data, moving the read/write head(s) 206 over the determined location, reading the data from the recording surface via the read/write channel 226, correcting any errors and formatting the data for transfer to the host device.

The read/write channel 226 may convert data between the digital signals received by the host interface 224 and/or processed by the processor 222 and the analog signals conducted through the read/write heads 206 for reading and writing data to the recording surface of the disks 202. The read/write channel 226 may further provide servo data read from the disk 202 to a servo controller that drives the actuator to position the read/write head 206. The read/write heads 206 may be positioned to read or write data to the target locations on the recording surface of the disks 202 by moving the read/write heads 206 radially across the disks using the actuator while a spindle motor rotates the disk to bring the target location under the read/write head.

According to embodiments, the controller 220 may further contain an adaptive read channel module 228. According to embodiments, the adaptive read channel module 228 receives the read-signal from the read/write head 206 and conditions the signal for the detection/decoding mechanism implemented in the storage device 200 based on a set of channel parameters. The adaptive read channel module 228 may further algorithmically optimize the channel parameter values to adapt the signal to the channel environment. The adaptive read channel module 228 may comprise hardware circuits in the read/write channel 226, processor-executable instructions for execution in the processor 222 or any combination of these and other components in the controller 220.

The controller 220 may further include a computer-readable storage medium or "memory" 230 for storing processor-executable instructions, data structures, and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). The memory 230 may further comprise a portion of the storage media of the storage device 200, such as the maintenance cylinder ("M/C") of the disk 202. For example, the memory 230 may store a firmware that comprises commands and data necessary for performing the operations of the storage device 200. According to some embodiments, the memory 230 may store processor-executable instructions that, when executed by the processor, perform the routines 100, 500, and 600 for determining an error type in a data error recovery procedure of the storage device 200 by correlating adaptive channel parameter values with channel parameter sets associated with various error types, as described herein.

Figures 3, 7:
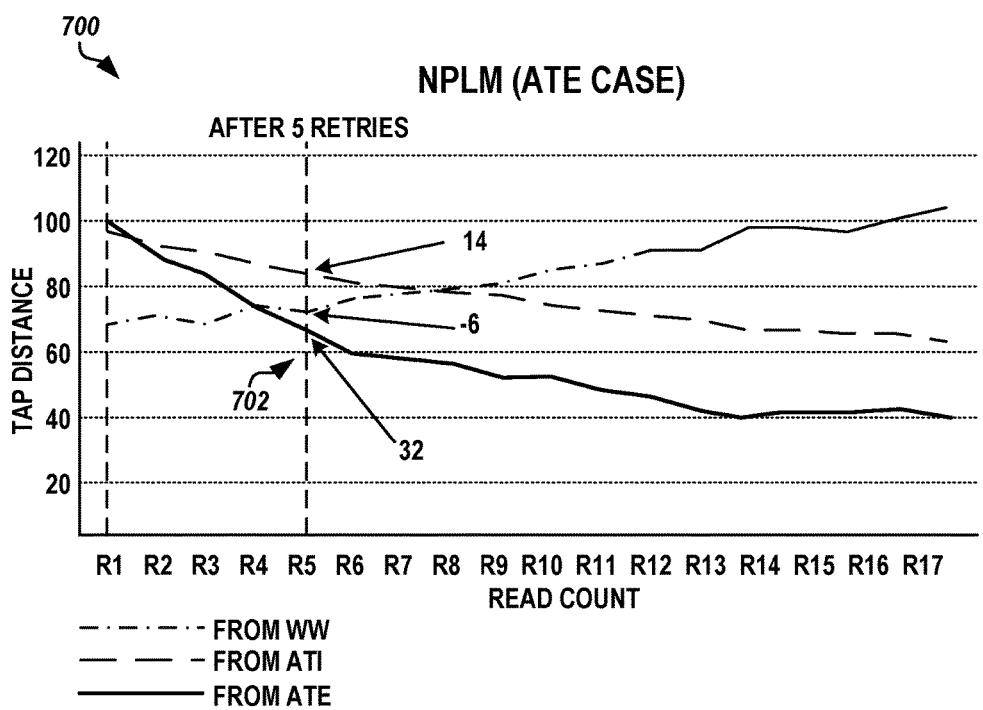
FIG. 3 is a data diagram showing a table of channel parameter sets associated with various error types, according to embodiments described herein.
FIG. 7 is a graph diagram showing additional details of procedures for determining an error type in a data error recovery procedure of a storage device by correlating adaptive channel parameter values with channel parameter sets associated with various error types, according to embodiments described herein.

In some embodiments, the memory 230 may store a channel parameters lookup table 232. As shown in FIG. 3, the channel parameters lookup table may contain a number of channel parameter sets 302A-302N (referred the herein generally as channel parameter set 302), each associated with an error type, that have been optimized by the adaptive read channel module 228 for the corresponding error environment. According to some embodiments, each channel parameter set 302 may comprise a number of channel parameter and coefficient values 304A-304K (referred to herein generally as parameter value 304) optimized for different error environments of the adaptive read channel. For example, each channel parameter set 302 may include NPML coefficients, FIR filter tap coefficients, and/or the like. In further embodiments, each channel parameter set 302 may include other parameter values 304 utilized by adaptive read channel architecture components known in the art, such as an MR bias parameter (voltage or current), an optimized cutoff frequency (Fc) and/or boost frequency (Fb) of continuous time filter, and the like. According to embodiments, each channel parameter set 302 also includes an error type value 306 for its associated error type.

In some embodiments, the channel parameter sets 302 may be generated during a CERT processing of the storage device 200 by simulating various error environments in the recording channel and utilizing the adaptive read channel module 228 to train parameter and coefficient values 304 for each error type, as will be described below in regard to FIG. 5. In other embodiments, the channel parameter sets 302 may be generated by mathematical simulation of the various error environments of the adaptive read channel architecture of the storage device 200 when the storage device is being designed. According to further embodiments, the channel parameter lookup table 232 may also contain a generic or default set of channel parameters 308 optimized for the adaptive read channel architecture outside of a particular error condition. The default set of channel parameters 308 may be generated at a same time as the channel parameter sets 302 associated with error types, for example. In further embodiments, the channel parameter lookup table 232 may be stored in some other computer-readable storage media in or accessible to the controller 220, including in the M/C of the disk 202.

In addition to the memory 230, the environment may include other computer-readable media storing program modules, data structures, and other data described herein for determining an error type in a data error recovery procedure of a storage device by correlating adaptive channel parameter values with channel parameter sets associated with various error types of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

In further embodiments, the storage device 200 may include a data error recovery module 240. The data error recovery module 240 may perform recovery procedure(s) in the storage device 200 when an unrecoverable data error ("UDE") occurs in the read channel, i.e., a data error that cannot be recovered by error-correction codes and the like in the detection/decoding process. According to embodiments, the data error recovery module 240 may utilize the routines, methods, and procedures described herein to determine an error type for the current error by correlating adaptive channel parameter values with channel parameter sets associated with various error types, and then optimize the error recovery sequence accordingly. In some embodiments, the data error recovery module 240 may be implemented in the controller 220 as software, hardware, or any combination of the two. For example, the data error recovery module 240 may be stored in the memory 230 as part of the firmware of the storage device 200 and may be executed by the processor 222 during user mode of the device when a UDE occurs. The data error recovery module 240 may alternatively or additionally be stored in other computer-readable media accessible by the controller 220. In further embodiments, the data error recovery module 240 may be implemented in a computing system external to and operably connected to the storage device 200, such as a host device, for example.

It will be appreciated that the structure of the storage device 200 may be different that that illustrated in FIG. 2 and described herein. For example, the processor 222, read/write channel(s) 226, memory 230, and other components and circuitry of the storage device 200 may be integrated within a common integrated circuit package, such as a system-on-chip ("SoC"), or they may be distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 4:
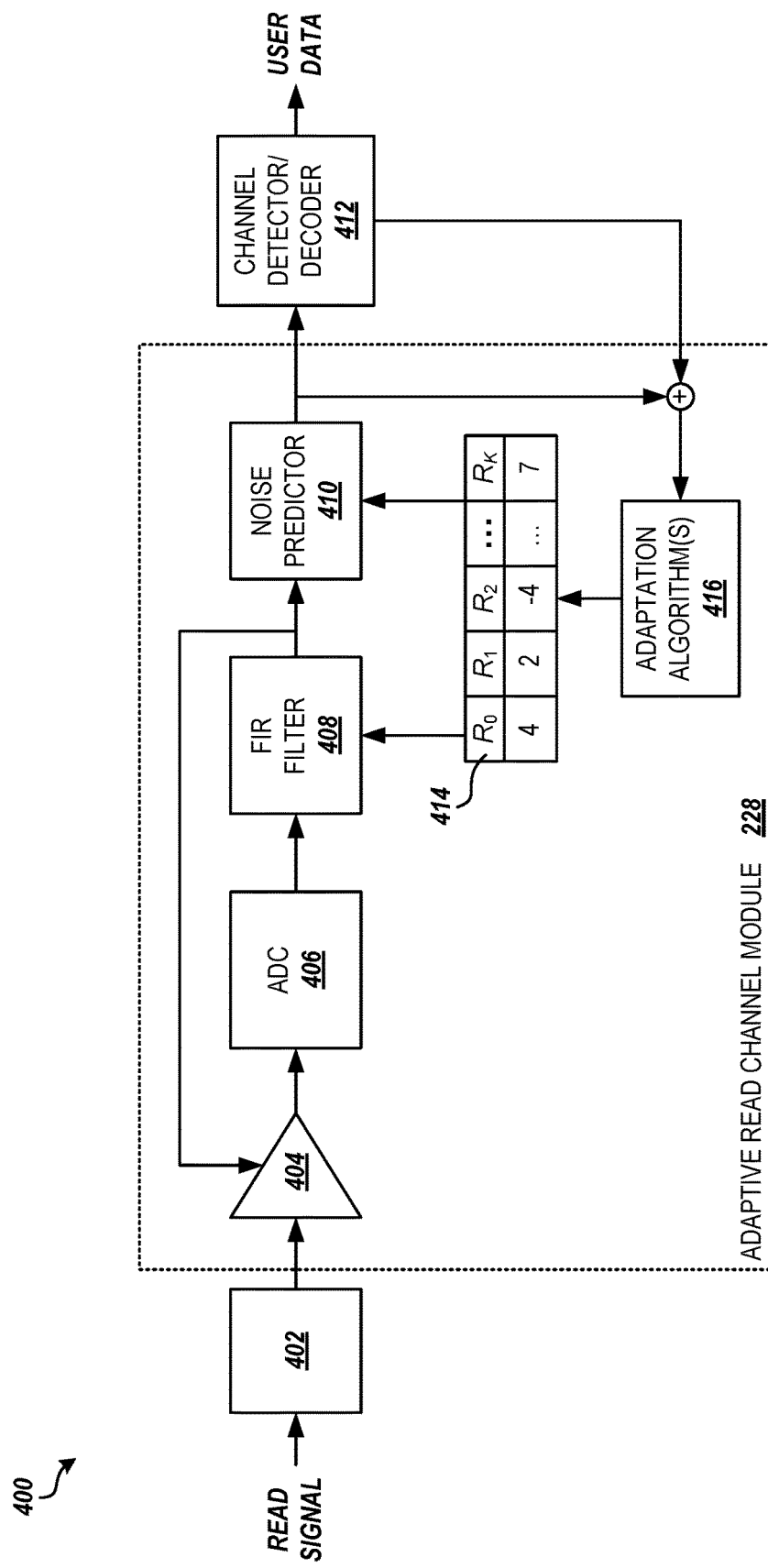
FIG. 4 is a block diagram showing an illustrative adaptive read channel architecture in a storage device, according to embodiments described herein.

FIG. 4 provides additional details of an illustrative adaptive read channel architecture 400 for conditioning a read-signal to fit an implemented detection method according to a set of channel parameters, such as NPML coefficients, FIR filter tap coefficients, MR bias voltages or current, cutoff or boost frequencies, and/or the like. In addition, the adaptive read channel architecture 400 may adapt the channel parameters to account for irregularities or conditions in the channel environment that introduce "noise." During a read operation in the storage device 200, the read-signal from the read/write head 206 may pass through signal pre-processing elements 402 before being received at the adaptive read channel module 228. The pre-processing elements 402 may include a pre-amplifier and the like. The adaptive read channel module 228 may include a variable-gain amplifier ("VGA") 404. The VGA 404 is used to maintain a constant signal amplitude for the read-signal into the adaptive read channel module 228 while the input to the VGA 404 varies in amplitude.

The output of the VGA 404 is coupled to an analog-to-digital converter ("ADC") 406 which transfers a digitized (sampled) read-signal to an input of a digital finite impulse response ("FIR") filter 408. The FIR filter 408 may filter and condition the samples received from ADC 406. The FIR filter 408 may also be referred to as an "equalizer." The filtered signal may then pass to a noise predictor 410. In some embodiments, the noise predictor 410 may employ Noise-Predictive Maximum-Likelihood ("NPML") methods to minimize the influence of noise in the detection process. The read-signal is then sent to the channel detector/decoder 412 where the user data is decoded from the adapted read-signal. For example, the channel detector/decoder 412 may include a Viterbi detector that provides digital signals which may be decoded by a channel decoder to produce the user data for the host computer in response to the read command.

In general, the output signal of the adaptive read channel module 228 sent to the channel detector/decoder 412 is based on the input read-signal and current channel parameters 414 that drive the processing of the read signal by the channel components. In some embodiments, the current channel parameters 414 may comprise NPML predictor coefficients for the noise predictor 410, tap coefficients for the FIR filter 408, and/or other parameter and coefficient values utilized by the components of the adaptive read channel module 228 or other channel components. According to embodiments, the adaptive read channel module 228 further contains adaptive algorithms 416 that modify or "adapt" the values of the current channel parameters 414 based on the performance of the channel detector/decoder 412 and other feedback from components to account for changes in the channel environment and improve decoding performance.

It will be appreciated that the components of the adaptive read channel architecture 300 may be different than that illustrated in FIG. 4 and described herein. For example, the adaptive read channel module 228 may contain multiple, parallel signal paths, each containing separate adaptive components and feeding separate channel detector/decoders 412 so that the read-signal may be conditioned and decoded using multiple sets of channel parameters simultaneously. Similarly, the illustrated connection pathways are provided for purposes of illustration and not of limitation, and some components and/or interconnections may be omitted for purposes of clarity.

Figure 5:
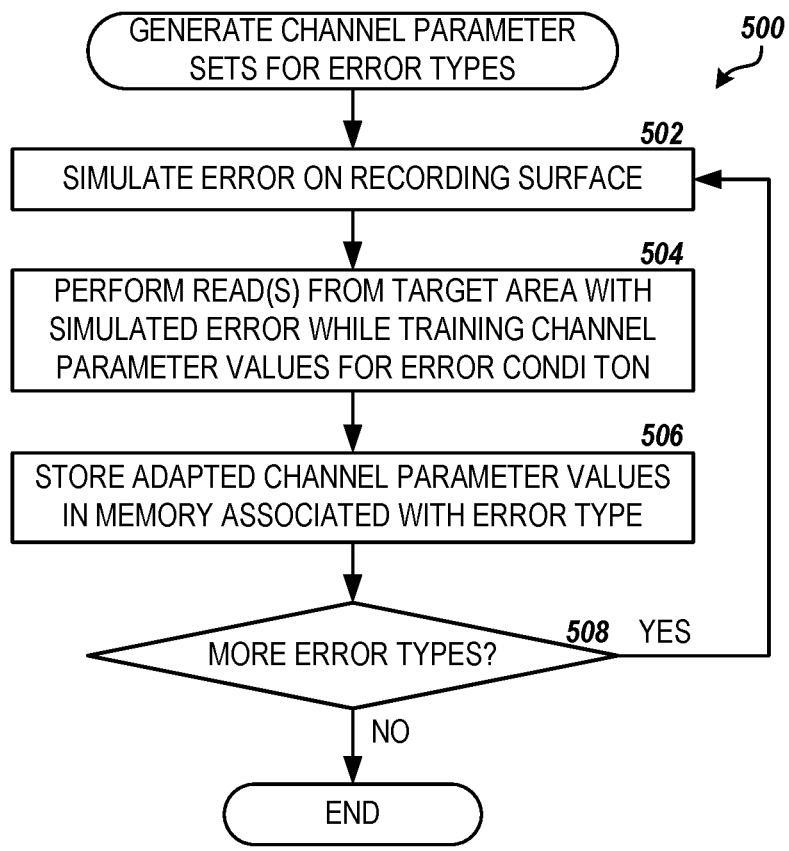
FIG. 5 is a flow diagram showing one routine for generating channel parameter sets associated with various error types, according to embodiments described herein.

FIG. 5 illustrates one routine 500 for generating channel parameter sets 302 associated with various error types in a storage device 200, according to some embodiments. The routine 500 may be performed for storage devices implementing the adaptive read channel architectures 400 described herein. According to some embodiments, the routine 500 may be performed by the controller 220 of the storage device 200 or by an external computing system operably connected to the storage device during the CERT processing to generate the channel parameter lookup table 232 for use by the data error recovery module 240, as will be described below in regard to FIG. 6. In other embodiments, the routine 500 may be performed by a computer system hosting a read channel simulator during the design of a storage device 200. In further embodiments, the routine 500 may be performed by some other combination of modules, processors, and devices.

The routine 500 begins at step 502, where a particular error condition is simulated in the storage device 200. For example, to simulate an STE/ATE error, the controller 220 may perform a number of writes of data to a test data track 204 on the recording surface of a disk 202 of the storage device while gradually encroaching from a single adjacent track. Similarly, a WW error may be simulated by writing data to the data track 204 while gradually reducing an adaptive flying height ("AFH") value, while an ATI error may be simulated by gradually increasing the number of writes on a an adjacent track. The bit-error rate ("BER") is measured through the read channel over the repeated writes until the BER reaches a threshold value, such as −1.8.

After simulating the error condition on the recording surface, the routine 500 proceeds from step 502 to step 504, where the controller 220 performs a number of reads of the test data track 204 while the current channel parameters 414 are trained in the adaptive read channel module 228 for the simulated error condition. For example, the controller may make 100 reads of the test data track 204 while the adaptation algorithms 416 attempts to optimize the current channel parameters 414 for the error environment. In further embodiments, the controller may simulate the error environment on other data tracks 204 on the recording surface and then read the data using the optimized current channel parameters 414 in order to verify their effectiveness for the error environment before storing the current channel parameters to the channel parameters lookup table 232 associated with the error.

Upon completion of the reads and the adaptation of the channel parameters, the routine 500 proceeds to step 506, where the controller 220 stores the adapted current channel parameters 414 in the channel parameters lookup table 232 associated with the simulated error type. For example, if the current channel parameters 414 are trained on a simulated STE/ATE error, then the controller 220 adds a channel parameter set 302 to the channel parameters lookup table 232 with and each parameter value 304 set to the corresponding value in the current channel parameters and an error type value 306 indicating an STE/ATE error type.

From step 506, the routine 500 proceeds to step 508, where the controller 220 decides whether more channel parameter sets are to be generated for additional error types. If additional error types are desired, then the routine 500 returns to step 502 where the process is repeated for the additional error types. According to some embodiments, the routine 500 may include simulating errors for each error type on a test data track 204 on a recording surface associated with each read/write head 206 in the storage device and/or in each storage zone on the recording surface(s). As a result, the channel parameters lookup table 232 may contain a separate channel parameter set 302 for each unique combination of error type, read/write head, and zone. Once all channel parameter sets 302 have been generated for all desired error types, read/write heads, and zones and stored in the channel parameters lookup table 232, the routine 500 ends.

Figure 6:
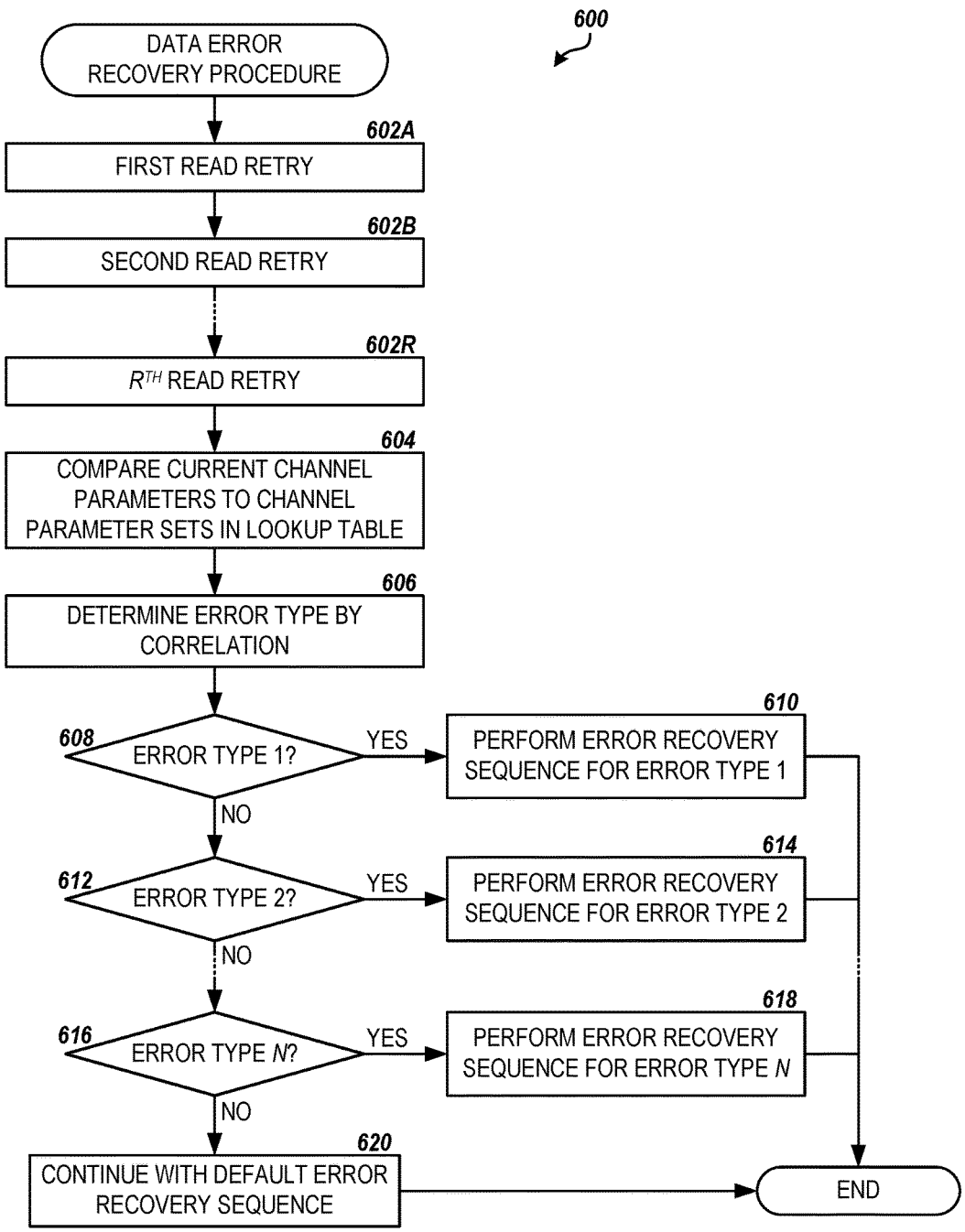
FIG. 6 is a flow diagram showing another routine for an enhanced error recovery procedure including determining an error type by correlating adaptive channel parameter values with channel parameter sets associated with various error types, according to embodiments described herein.

FIG. 6 illustrates a routine 600 for determining an error type in a data error recovery procedure of a storage device by correlating adaptive channel parameter values with channel parameter sets associated with various error types, according to some embodiments. According to embodiments, the routine 600 may be performed by the data error recovery module 240 of a storage device 200 upon occurrence of a UDE. In further embodiments, the routine 600 may be performed by the controller 220 of the storage device 200, by external processors or computing systems performing storage processing in the storage device, or some other combination of modules, processors, and devices.

The routine 600 begins at steps 602A-602R, where the data error recovery module 240 performs a number of read retries of the target data area (e.g., data track(s) 204 or sector(s)) where the UDE occurred while the current channel parameters 414 in the adaptive read channel module 228 are trained for the error environment. For example, the adaptive read channel module 228 may initially attempt R=5 read retries. If the read retries do not result in a successful read of the target data area, then the routine 600 proceeds from step 602R to step 604, where the data error recovery module 240 compares the adapted current channel parameters 414 to each of the channel parameter sets 302 associated with an error type in the channel parameters lookup table 232. For example, a minimum distance A(r), B(r), . . . N(r) between the parameter values 304 $A_0$-$A_K$, $B_0$-$B_K$, . . . $N_0$-$N_K$ of each channel parameter set 302A-302N and the corresponding parameter value $R_0$-$R_K$ in the current channel parameters 414 trained for the current error environment may be calculated as followed:

$$A(r) = \sum_{i=0}^{K} A_i - R_i$$

$$B(r) = \sum_{i=0}^{K} B_i - R_i$$

$$\vdots$$

$$N(r) = \sum_{i=0}^{K} N_i - R_i$$

From step 604, the routine 600 proceeds to step 606, where the data error recovery module 240 determines an error type for the channel environment based on the comparison between the adapted current channel parameters 414 and the channel parameter sets 302 performed in step 604. For example, a correlation may be performed between the minimum distance calculated for each error type above and a minimum distance A(d), B(d), . . . N(d) between the parameter values 304 $A_0$-$A_K$, $B_0$-$B_K$, . . . $N_0$-$N_K$ of each channel parameter set 302A-302N and the corresponding parameter values $C_0$-$C_K$ of a default set of channel parameters 308 optimized for the adaptive read channel architecture, as described herein. The minimum distance A(d), B(d), . . . N(d) may be calculated as followed:

$$A(d) = \sum_{i=0}^{K} A_i - C_i$$

$$B(d) = \sum_{i=0}^{K} B_i - C_i$$

$$\vdots$$

$$N(d) = \sum_{i=0}^{K} N_i - C_i$$

Finally, the differences between the corresponding minimum distances A(d)-A(r), B(d)-B(r), . . . N(d)-N(r) are computed for each error type, with the largest difference value determining the most probable error type. In order for the difference calculation to yield the most probable error type, the minimum distances may be normalized before the differences are calculated, according to some embodiments. FIG. 7 shows a graph 700 of the result of the above correlation calculations with the minimum distances normalized to 100 for three different error types, ATE, ATI, and WW, where the channel parameters represent NPML coefficients. After 5 read retries, the largest difference of 32 indicates that the most probable error type is an STE/ATE error, as shown at 702.

From step 606, the routine 600 proceeds to steps 608-618, where the data error recovery module 240 selects the most effective error recovery procedure sequence based on the determined error type. For example, if the most probable error type is determined to be ATE, then the data error recovery module 240 may utilize an error recovery sequence optimized for STE/ATE to attempt to recover from the error. According to embodiments, this may involve loading the channel parameter set 302A associated with the ATE error type from the channel parameters lookup table 232 to the current channel parameters 414 before subsequent read retries, concentrating the adaption algorithms 416 in the adaptive read channel module 228 to key channel parameters most related to STE/ATE errors, changing or reordering the next steps in the recovery procedure to enhance error recovery from STE/ATE errors, and/or the like. If no probable error type is determined by the data error recovery module 240, the routine 600 may proceed to step 620, where the generic default error recovery sequence may be continued, according to further embodiments. From step 620, the routine 600 ends.

Figure 8A:
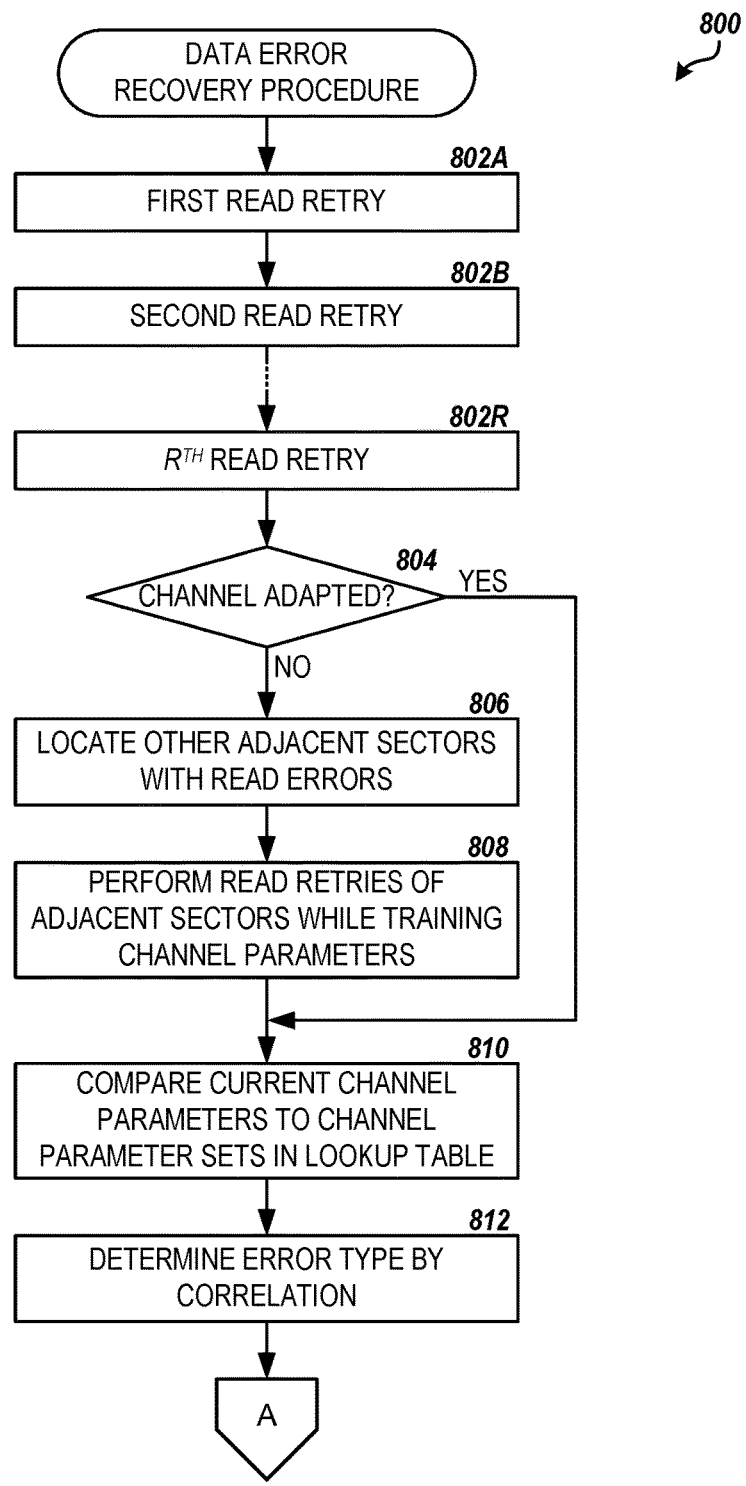
FIGS. 8A-8B are a flow diagram showing a further routine for an enhanced error recovery procedure including determining an error type by correlating adaptive channel parameter values with channel parameter sets associated with various error types, according to embodiments described herein.
Figure 8B:
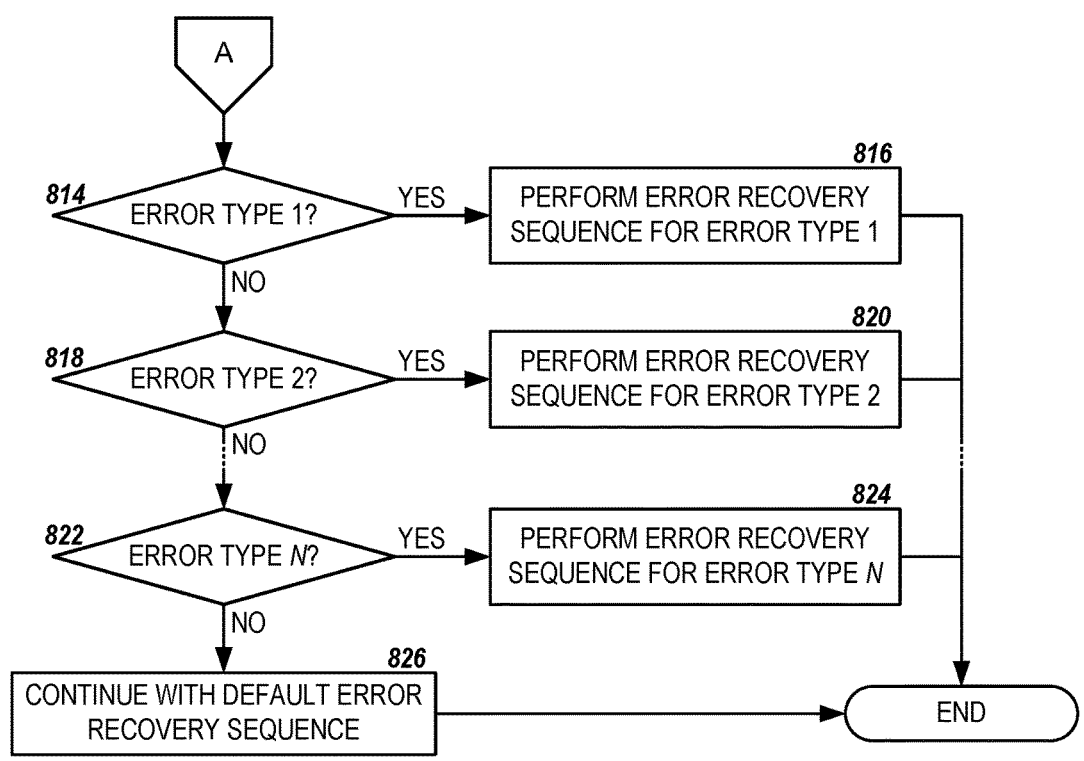

FIGS. 8A-8B illustrate another routine 800 for determining an error type in a data error recovery procedure of a storage device by correlating adaptive channel parameter values with channel parameter sets associated with various error types, according to some embodiments. The routine 800 may be performed by the data error recovery module 240 of a storage device 200 implementing a read channel with a low-density parity-check ("LDPC") decoder upon occurrence of a UDE. While the routine 600 described above in regard to FIG. 6 may be best suited for adaptive read channels implementing least mean square ("LMS") circuitry for the adaptation algorithms 416, additional steps may be advantageous for a read channel implementing an LDPC decoder to account for the lack of channel adaptation from the limited number of read retries performed before determining the error type. In further embodiments, the routine 800 may be performed by the controller 220 of the storage device 200, by external processors or computing systems performing storage processing in the storage device, or some other combination of modules, processors, and devices.

The routine 800 begins at steps 802A-802R, where the data error recovery module 240 performs the limited number of read retries of the target data area to train the current channel parameters 414 for the error environment, as described above in regard to steps 602A-602R shown in FIG. 6. From step 802R, the routine 800 proceeds to step 804, where the data error recovery module 240 determines if the channel has been adapted, i.e. whether the current channel parameters 414 are sufficiently different from the default set of channel parameters 308 to account for the error condition in the channel. If the channel has been adapted, the routine 800 proceeds from step 804 to step 810, where the routine proceeds as described above in regard to steps 604-620 shown in FIG. 6.

If the channel has not been adapted, then the routine 800 proceeds from step 804 to step 806, where the data error recovery module 240 locates adjacent sectors on the target data track 204 that have experienced read failures. When multiple sectors on the same data track 204 have experienced read failures, it is very likely that the read errors have all occurred from the same error or error type. According to some embodiments, the adjacent sectors with read errors may be located by scanning adjacent sectors on the data track 304 and determining those sectors with bit-in-error ("BIE") levels above some threshold.

From step 806, the routine 800 proceeds to step 808, where the data error recovery module 240 performs a number of reads on the adjacent sectors in error located in step 806 to further train the current channel parameters 414 for the error environment. From step 808, the routine 800 proceeds to steps 810-826, where the data error recovery module 240 compares the adapted current channel parameters 414 to each of the channel parameter sets 302 associated with an error type to determine an error type and perform the appropriate recovery procedure accordingly, as described in regard to steps 604-620 above. From step 826, the routine 800 ends.

Based on the foregoing, it will be appreciated that technologies for enhancing error recovery procedures in a storage device by utilizing on-the-fly error type detection are presented herein. While embodiments are described herein in regard to an HDD device having an adaptive read channel architecture, it will also be appreciated that the embodiments described in this disclosure may be utilized in the read channel of any other communication or storage device having an adaptive system in which error conditions may be simulated and channel parameter sets trained for the error environments prior to error recovery. This may include a magnetic disk drive, a hybrid magnetic and solid-state drive, a magnetic tape drive, an optical disk drive, a communications receiver or transceiver device, and the like. The above-described embodiments are merely possible examples of implementations, merely set forth for a clear understanding of the principles of the present disclosure.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method of recovering from a read error in a storage device, the method comprising steps of:
   performing a number of read retries through an adaptive read channel of the storage device;
   determining an error type by comparing current channel parameters of the adaptive read channel to a plurality of predetermined channel parameter sets generated at a certification processing of the storage device, each predetermined channel parameter set associated with an error type; and selecting an error recovery sequence for recovery from the read error based on the determined error type.

2. The method of claim 1, wherein the plurality of predetermined channel parameter sets are generated by:
simulating an error condition of a first error type on a target area of a recording media of the storage device;
repeatedly reading the target area through the adaptive read channel while training the current channel parameters for the error condition;
storing the trained current channel parameters in a memory of the storage device associated with the first error type; and
repeating the simulating, reading, and storing steps for additional error types.

3. The method of claim 2, wherein the trained current channel parameters for each error type are stored in a non-volatile memory of the storage device.

4. The method of claim 1, wherein determining the error type comprises performing a correlation between a normalized minimum distance between parameter values of each of the plurality of predetermined channel parameter sets and the current channel parameters and a normalized minimum distance between parameter values of each of the plurality of predetermined channel parameter sets and default channel parameters optimized for the adaptive read channel in the storage device.

5. The method of claim 1, wherein the adaptive read channel comprises a noise-predictive maximum-likelihood ("NPML") filter and the predetermined channel parameter sets comprise NPML predictor coefficients.

6. The method of claim 1, wherein the adaptive read channel comprises a digital finite impulse response ("FIR") filter and the predetermined channel parameter sets comprise FIR filter tap coefficients.

7. The method of claim 1, wherein predetermined channel parameter sets are associated with one or more of side-track erasure error type, weak write error type, and adjacent track interference error type.

8. The method of claim 1, wherein selecting the error recovery sequence for recovering from the read error based on the determined error type comprises utilizing key parameter values from the predetermined channel parameter set associated with the determined error type in the adaptive read channel.

9. The method of claim 1, wherein the storage device comprises a hard-disk drive ("HDD") device.

10. An adaptive read channel system comprising:
a read channel including at least one adaptive component, the at least one adaptive component comprising one of a noise-predictive maximum-likelihood ("NPML") filter and a digital finite impulse response ("FIR") filter;
a memory storing a plurality of predetermined channel parameter sets, each predetermined channel parameter set associated with an error type and comprising at least one of NPML predictor coefficients or FIR filter tap coefficients; and
a processor operably connected to the memory and the read channel and configured to
determine whether a read error has occurred in the read channel,
upon determining that the read error has occurred, perform at least one read-retry while training current channel parameters for the read channel to an error environment,
after the at least one read-retry, compare the current channel parameters with the plurality of predetermined channel parameter sets to determine a most probable error type, and
select an error recovery sequence for recovery from the read error based on the determined most probable error type.

11. The adaptive read channel system of claim 10, wherein comparing the current channel parameters with the plurality of predetermined channel parameter sets to determine the most probable error type comprises:
computing a first minimum distance between parameter values of each of the plurality of predetermined channel parameter sets and the current channel parameters;
computing a second minimum distance between parameter values of each of the plurality of predetermined channel parameter sets and default channel parameters optimized for the read channel; and
determining a difference value between the first minimum distance and the second minimum distance for each error type, the largest difference value indicating the most probable error type.

12. The adaptive read channel system of claim 10, wherein the processor is further configured to generate the plurality of predetermined channel parameter sets by:
simulating an error condition in the read channel of a first error type;
training the current channel parameters for the error condition;
storing the trained current channel parameters in the memory associated with the first error type; and
repeating the simulating, training, and storing steps for additional error types.

13. The adaptive read channel system of claim 10, wherein the read channel is implemented in a hard-disk drive ("HDD") device.

14. The adaptive read channel system of claim 13, wherein the plurality of predetermined channel parameter sets are generated at a certification processing of the HDD device.

15. A non-transitory computer-readable medium having processor-executable instructions stored thereon that, when executed by a processor in a storage device, cause the processor to:
determine that an error has occurred in a read channel of the storage device, the read channel having at least one adaptive component;
upon determining that the error has occurred, perform at least one read-retry while training current channel parameters for the read channel to an error environment;
determine an error type for the error by comparing the current channel parameters with a plurality of predetermined channel parameter sets, each predetermined channel parameter set associated with an error type, the plurality of predetermined channel parameter sets generated at a certification processing of the storage device; and
select an error recovery sequence for recovery from the error based on the determined error type.

16. The computer-readable medium of claim 15, wherein the plurality of predetermined channel parameter sets are generated by:
simulating an error condition of a first error type on a target area of a recording media of the storage device;

repeatedly reading the target area through the read channel while training the current channel parameters for the error condition;
storing the trained current channel parameters in a non-volatile memory of the storage device associated with the first error type; and
repeating the simulating, reading, and storing steps for additional error types.

* * * * *